(12) United States Patent
Labuda et al.

(10) Patent No.: US 8,266,126 B2
(45) Date of Patent: Sep. 11, 2012

(54) SYSTEM WITH MULTIPLE CONDITIONAL COMMIT DATABASES

(75) Inventors: David Labuda, Palo Alto, CA (US); Keith Brefczynski, Saratoga, CA (US)

(73) Assignee: Matrixx Software, Inc., Mountain View, CA (US)

( * ) Notice: Subject to any disclaimer, the term of this patent is extended or adjusted under 35 U.S.C. 154(b) by 158 days.

(21) Appl. No.: 12/661,897

(22) Filed: Mar. 24, 2010

(65) Prior Publication Data

US 2011/0238641 A1 Sep. 29, 2011

(51) Int. Cl.
*G06F 17/30* (2006.01)

(52) U.S. Cl. .......................... 707/703; 707/704; 707/615

(58) Field of Classification Search .................. 707/703, 707/704, 615
See application file for complete search history.

(56) References Cited

U.S. PATENT DOCUMENTS

| | | | |
|---|---|---|---|
| 5,551,046 A | 8/1996 | Mohan et al. | |
| 5,586,254 A * | 12/1996 | Kondo et al. | 714/25 |
| 5,813,016 A * | 9/1998 | Sumimoto | 1/1 |
| 5,845,292 A * | 12/1998 | Bohannon et al. | 1/1 |
| 6,125,371 A * | 9/2000 | Bohannon et al. | 707/695 |
| 6,411,985 B1 | 6/2002 | Fujita et al. | |
| 6,701,345 B1 | 3/2004 | Carley et al. | |
| 6,799,188 B2 * | 9/2004 | Weedon | 1/1 |
| 7,165,129 B1 * | 1/2007 | Okmianski et al. | 710/52 |
| 7,177,866 B2 * | 2/2007 | Holenstein et al. | 707/615 |
| 7,275,074 B2 * | 9/2007 | Chandrasekaran | 707/703 |
| 7,437,361 B2 * | 10/2008 | Luo | 1/1 |
| 7,483,965 B1 | 1/2009 | Gerraty | |
| 7,962,458 B2 * | 6/2011 | Holenstein et al. | 707/704 |
| 2003/0200277 A1 | 10/2003 | Kim | |
| 2004/0098425 A1 * | 5/2004 | Wiss et al. | 707/204 |
| 2006/0131385 A1 * | 6/2006 | Kim | 235/379 |
| 2006/0219772 A1 * | 10/2006 | Bernstein et al. | 235/379 |
| 2007/0174355 A1 * | 7/2007 | Woo et al. | 707/202 |
| 2007/0198599 A1 | 8/2007 | Tobies | |
| 2007/0282839 A1 * | 12/2007 | Walker | 707/8 |
| 2008/0034251 A1 * | 2/2008 | Singhal et al. | 714/5 |
| 2009/0077135 A1 * | 3/2009 | Yalamanchi et al. | 707/200 |
| 2009/0119667 A1 * | 5/2009 | Hou et al. | 718/101 |
| 2009/0187612 A1 | 7/2009 | Kaijima et al. | |
| 2009/0234760 A1 * | 9/2009 | Walter | 705/30 |
| 2010/0121829 A1 * | 5/2010 | Bendig | 707/703 |
| 2010/0287068 A1 * | 11/2010 | Hu et al. | 705/27 |

OTHER PUBLICATIONS

Decker et al., "Checking Violation Tolerance of Approaches to Database Integrity", ADVIS 2006, LNCS 4243, pp. 139-148 (2006).*
Martinenghi et al., "Transaction Management with Integrity Checking", DEXA 2005, LNCS 3588, pp. 606-615 (2005).*
Liu et al., "The Performance of Two Phase Commit Protocols in the Presence of Site Failures", Distributed and Parallel Database, 6, pp. 157-182 (1998).*

* cited by examiner

*Primary Examiner* — Phuong Thao Cao
(74) *Attorney, Agent, or Firm* — Van Pelt, Yi & James LLP

(57) ABSTRACT

A system for processing a transaction is disclosed. The system comprises a processor and a memory. The processor is configured to check a condition using data in a first database, wherein the data is associated with a transaction, wherein the data in the first database is latched before checking the condition and is unlatched after checking the condition. The processor is further configured to indicate to a second database to check the condition using data in the second database, wherein the data is associated with the transaction. The data in the second database is latched before checking the condition and is unlatched after checking the condition. The memory is coupled to the processor and configured to provide the processor with instructions.

17 Claims, 17 Drawing Sheets

SYSTEM WITH MULTIPLE CONDITIONAL COMMIT DATABASES

BACKGROUND OF THE INVENTION

High availability of data or redundancy for failure situations can be achieved with databases by having multiple databases store the same variables and values in those variables. Database data where the same variables are stored by multiple databases typically requires locking and/or establishing an owner in order to maintain synchronization of the variables between the multiple databases. For example, a locking of a given variable in all the multiple databases except for an owner who is accessing or modifying the given variable and then propagating any change to the given variable before unlocking. However, the locking of the variables and the propagating of the values creates overhead in the system and can lead to deadlocks in processing data in the databases particularly when more than one requested transaction requires a single given variable or value within the variable.

BRIEF DESCRIPTION OF THE DRAWINGS

Various embodiments of the invention are disclosed in the following detailed description and the accompanying drawings.

DETAILED DESCRIPTION

Figure 1A:
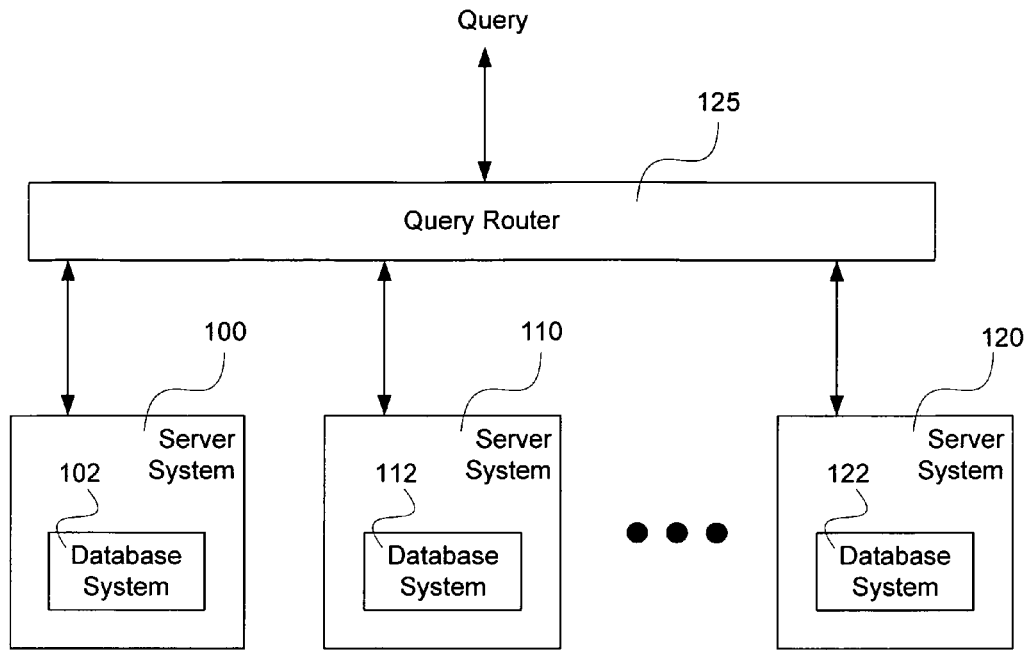
FIG. 1A is a block diagram illustrating an embodiment of a system with multiple conditional commit databases.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for processing a transaction is disclosed. The system comprises a processor and a memory. The processor is configured to check a condition using data in a first database, wherein the data is associated with a transaction, wherein the data in the first database is latched before checking the condition and is unlatched after checking the condition. The processor is further configured to indicate to a second database to check the condition using data in the second database, wherein the data is associated with the transaction. The data in the second database is latched before checking the condition and is unlatched after checking the condition. The memory is coupled to the processor and configured to provide the processor with instructions.

A system with multiple conditional commit databases is disclosed. A system for processing a transaction comprises a processor, an interface, and a memory. The processor is configured to execute locally a condition check of a transaction based on a locally stored version of a variable. The interface is configured to indicate the condition check of the transaction to other servers to be done using a locally stored version of the variable. The processor is further configured to determine whether to proceed with the transaction based on results of the condition check of the transaction. The memory is coupled to the processor and configured to provide the processor with instructions.

In some embodiments, multiple servers storing the same data are available to process transactions and/or requests. A query is routed to one of the servers for processing. Because a conditional commit database allows access to data at almost all times even when the data is being used/potentially modified by a transaction associated with another query, each individual server and all of the multiple servers have almost no restrictions to processing a query because a data/variable is inaccessible due to another query. The ability of the conditional commit database to allow access is based on the design of the database which allows transactions to process as long as conditions are met (e.g., as long as a phone account balance has more than 100 minutes allow call to proceed). In various embodiments, a query comprises a) requesting permission to grant service to a subscriber based on their available balances and credit; b) after providing network access (e.g., granting service), requesting for charging for a service that has been provided; or any other appropriate query. The conditional commit database also allows latching of data in a database for extremely short periods of time around data accessing and data updating. For example, precise synchronization of data in all databases is not an absolute requirement; rather conditions associated with a transaction must be met (e.g., balance greater than $50 or balance more than 100 minutes, etc.), and this enables restricting access to the data only around access times for the data not during the entire time of the transaction or the time to determine a response to a query. In some embodiments, latching secures exclusive access to data for an atomic region of computer instructions that contains no external communications or references (as opposed to locking, where exclusive access is held across external communications or references), and therefore executes at full speed without waiting for completion of any external event.

Although the specific examples sometimes involve balances and an application of the system for multiple conditional commit databases for processing transactions associated with billing for phone usage, the system is equally applicable to other data types and other types of transaction processing. For example, the system can support applications to process financial payments, fraud detection, mediation, settlement calculations, etc.

FIG. 1A is a block diagram illustrating an embodiment of a system with multiple conditional commit databases. In the example shown, a query is processed by query router 125. For example, a query comprises a request by a network to see if a user (e.g., John Doe) is allowed to use a service—make a call, send a text message, use a data network, etc. Routing is determined in order to evenly distribute load across the servers. For example, a query is routed to a server to distribute load evenly and/or a query is not distributed to a server that is not available (e.g., fully loaded, not connected, undergoing maintenance, etc.). In various embodiments, distribution is based at least in part on data in or data associated with the query (e.g., data embedded in the query, data accessed as part of processing the query, etc.), on the type of network event associated with the query (e.g., voice call, short message service (SMS) message, data network interaction, etc.), on the source of the event associated with the query (e.g., local subscriber using a network, roaming user using a network, etc.), or based at least in part on any other appropriate information associated with the query. In some embodiments, routing of a query is based at least in part on the loading of a server system in relation to the loading of another server system. Query router 125 determines a processing host system—for example, one of a plurality of multiple systems represented in FIG. 1A by server system 100, server system 110, or server system 120—for the received query. Each server system includes a conditional commit database system—for example, server system 100 includes database system 102; server system 110 includes database system 112; and server system 120 includes database system 122. The conditional commit database systems hold the same data so that in the event that a system fails there are redundant systems available to handle queries. A commit for a database update of a data entry stored in the database for a given processing host is communicated to each of the other conditional commit databases and queued for commitment in each of the other databases. In some embodiments, although all of the databases receive each data entry update, a given database processes database updates in a different order from another database, in which case the data in all the databases are not exactly synchronized for a short period of time. In some embodiments, in the event that two transactions pass each other resulting in an order for the transactions (e.g., a commit order) on one server that is ambiguous or not the same as other servers, the transactions are aborted and the two transactions are retried. In some embodiments, in the event that two transactions pass each other resulting in an order for the transactions (e.g., a commit order) on one server that is ambiguous or not the same as other servers, the transactions are allowed to proceed and the databases are momentarily out of synchronization, then achieve synchronization again once both transactions have been committed on both servers. In some embodiments, a transaction indicates in a prepare message sent from a server that the $8^{th}$ dollar needs to be deducted from the balance, and a remote server says that you can have a dollar from the balance (e.g., the balance is sufficient to deduct the dollar) but the $8^{th}$ dollar is not available.

In some embodiments, database data is divided into multiple types based on the access patterns of the data. For instance, data may be divided into high update rate data (e.g. balances, which may have frequent and even simultaneous updates) and low update rate data (e.g. customer profile data, which typically has infrequent updates and almost never simultaneous updates). For the example of a simultaneous update of a balance, it is straightforward to process the correct result (e.g., subtract both, add both, subtract and add, etc.). However, for other data such as customer profile data, it is less obvious how to process the correct results if simultaneous updates are allowed (e.g. in two simultaneous updates each editing a list of calling group numbers for the same customer, which version of the list is correct?) Also, it should be noted that, in some embodiments, for a low update rate object such as a customer profile that has many fields, building and using the infrastructure to indicate which fields are to be updated by a given transaction, which fields are currently in the process of being updated by other transactions, and determining when two transactions' updates may proceed simultaneously may add overhead to processing the transactions, and may not provide much value since the probability of two low update rate object transactions updating at the same time is extremely low. In all cases, when all queued committed updates to the databases are processed, all the databases will again be fully synchronized.

The conditional commit databases do not lock data for the time during which an application manipulates the data. The application can read, write, or otherwise access data in each of the databases even when other operations are active against the same data. A conditional write to any one of the databases is enabled to allow an application to write to the database in the event that one or more conditions on database entries are met. For example, a write to a database entry is dependent on another database entry's value having stayed the same, be above a certain value, having not changed more than a certain amount since a prior reading of a value, be below a certain value, having changed more than a certain amount since a prior reading of a value, having been written (or updated) since a prior reading, having been not written (or not updated) since a prior specific reading, having been read or not read since a prior reading, having been written or not written since a prior specific writing, having been read or not read since a prior writing, or any other appropriate condition. A conditional commit database can then reduce, if not eliminate, overheads associated with access locking. A situation where multiple accesses to a data entry may or may not impact an application's interaction with a conditional commit database data entry are handled using the conditional update. In the event that a conditional commit database entry does not satisfy the condition associated with the conditional update, then the application can restart the process or calculation for the associated database entries. For a conditional commit database where the probability of a problem situation arising from inappropriate access of database entries by applications is low, then database overheads for access locking are reduced or eliminated for all database interactions in favor of handling the retry of a conditional update command only in the low probability event that a condition is not met. The conditional commit technology also enables multiple system database architectures where operation (e.g., previously locking operations) across databases is required. The shorter the locking, or lack of locking, for multiple system architectures the less likely that performance issues will arise due to the tracking and synchronization requirements of the multi-server locks (e.g., blocking other operations on the database while waiting for a lock to be released on a data—for example, multiple operations need to access a single account and all operations are forced to wait in a single file line to execute because each operation locks the data for the single account).

In some embodiments, the conditional commit enables faster processing of a database system. Typically, database systems ensure that commits are made without any corruption to data involved in the commit by locking the involved data. The overhead required for this slows processing by using processing cycles to track the involved data and queue any processes that want to access involved data. These overheads can, in systems with a high number of transactions to process, significantly degrade overall performance. Eliminating the overheads and allowing some potential corruption of data can speed the system. In some embodiments (e.g.—network traffic pattern analysis), this small potential for data corruption is acceptable. In some embodiments (e.g. financial transactions), no potential corruption of the data is tolerable. In these cases, in the event that data would be corrupted (e.g., a detection is made that data is corrupted by an upcoming transaction), a data update or other data process is aborted and the update or other process is redone (e.g., recalculated and/or resubmitted). Potential corruption of data is detected using the conditions placed on the commits. The effects of the potential corruption of data can be corrected, if necessary (e.g., if the condition is not met), by recalculating and resubmitting. For example, a user (e.g., Joe) is trying to make a phone call; a query is sent to request approval; the Charge Server converts the query into a transaction in the database reserving or charging for the use of resources (e.g., Joe's resources); the database indicates that this should be OK; an attempt is made to reserve the time for the call (e.g., 5 minutes); if the reservation is OK, then the user is approved; if the reservation is not then the reservation is aborted; in a loop between the Charge Server and the Transaction Server, a determination ends up being made that a call for so long is possible and approved and this is sent back as a response to the initial query. For scenarios, where potential corruption occurrences are very rare, the system can process transactions faster and achieve higher transaction volumes.

In various embodiments, a database has a read lock (e.g., no access is allowed to each of the multiple items for other read/write requests during a requested read of the multiple items) or has no read lock (e.g., access is allowed to any item for other read/write requests during a read request for multiple items).

In various embodiments, data in the database comprises numbers, strings, dates, times, bytes, floating point values, or any other appropriate data.

In some embodiments, the databases in the server systems (e.g., database 102 in server system 100, database system 112 in server system 110, and database 122 in server system 120) keep in synchronization with each other by sending messages/instructions between each other to ensure synchronization of data. For example, synchronization steps include a local prepare, a remote prepare, a local commit and a remote commit step. Local prepare tests the transaction conditions locally and creates local transactional state so any other queries being processed on the same server will know this update is pending. Remote prepare tests the transaction conditions on each of the remote database systems and creates transactional state in each of those database systems so any queries being processed on remote servers will know this update is pending. Local commit irrevocably logs the transaction as committed and updates the local data to a new value. Remote commit updates each remote copy of the data to a new value.

In some embodiments, 1) a transaction comes in; 2) a local prepare is performed (e.g., data associated with the transaction is latched—data that has a condition or is being updated such as a balance data; the condition(s) associated with the transaction are checked locally; in the event that a condition(s) does not pass, then the transaction is aborted; in the event that the condition(s) pass, then the transaction buffer and update buffer(s) are set up (e.g., the transaction buffer is allocated or modified if already allocated and an update buffer for each data to be updated is allocated); the data associated with the transaction is unlatched; and 3) the prepare is then caused to be performed in the other databases (e.g., a message to perform the prepare is sent out to all other servers, individual messages to perform the prepare are sent out to other servers, or the remote operations for the prepare are performed on the remote database using the local processor) where the remote prepare includes latching, checking the condition(s), setting up a transaction buffer and update buffer(s), unlatching, and sending a message back that the prepare passed or failed; the local server waits for all the remote servers to get back their pass/fail status (e.g., a checklist is kept locally regarding the status of the prepare at the remote sites).

In some embodiments, in the event of a unanimous pass, the transaction is logged to disk (note that this is the moment of commit), a local commit is performed (e.g., all data associated with the transaction is latched again; the update of the data associated with the transaction is performed; the transaction buffer and the update buffer(s) are updated to reflect the commit; and the data associated with the transaction is unlatched), the commit is then caused to be performed on the other servers (e.g., a message is multicast out to cause the other servers to perform a commit, a message is sent to each and every other server to perform a commit, or a commit is performed using the local processor and the remote database) where the remote commit comprises similar steps to a local commit (e.g., latching, updating the data, updating the transaction buffer and the update buffer(s) to reflect the commit, and unlatching); a message is sent back from each remote server and/or database to indicate that the commit was completed. In various embodiments, the remote commit comprises deallocating the transaction buffer instead of updating the transaction buffer, not logging to disk, or any other appropriate processes for a remote commit. In some embodiments, there is a separate cycle after the commit cycle that cleans up the transaction buffers on the local and remote servers.

In some embodiments, in the event that there is not a unanimous pass, a local abort is performed (e.g., latching of the associated data, reverting of the update buffer to a state prior to the prepare, and unlatching of the data); an abort is caused to be performed on the remote servers (e.g., a multicast abort message is sent, an abort is sent to each remote server, or an abort is caused using a local processor for the remote server); the local server waits until the responses from all the remote servers indicates that the remote servers have aborted; in the event that all the remote servers have aborted, then the local transaction buffer is deallocated or taken apart; in the event that not all of the remote servers indicate a successful abort has been performed, then an analysis is performed to determine whether the remote server has malfunctioned or has any other problems.

In some embodiments, the multiple servers (e.g., server 100, server 110, and server 120) are connected to a communications bus. In various embodiments, a database and an application exist on the same server, a database and an application do not exist on the same server, a connected set of servers includes servers with both configurations (e.g., application/database on a single server and separate servers for application and database), or any other appropriate configuration of servers and functionality on the servers.

Figure 1B:
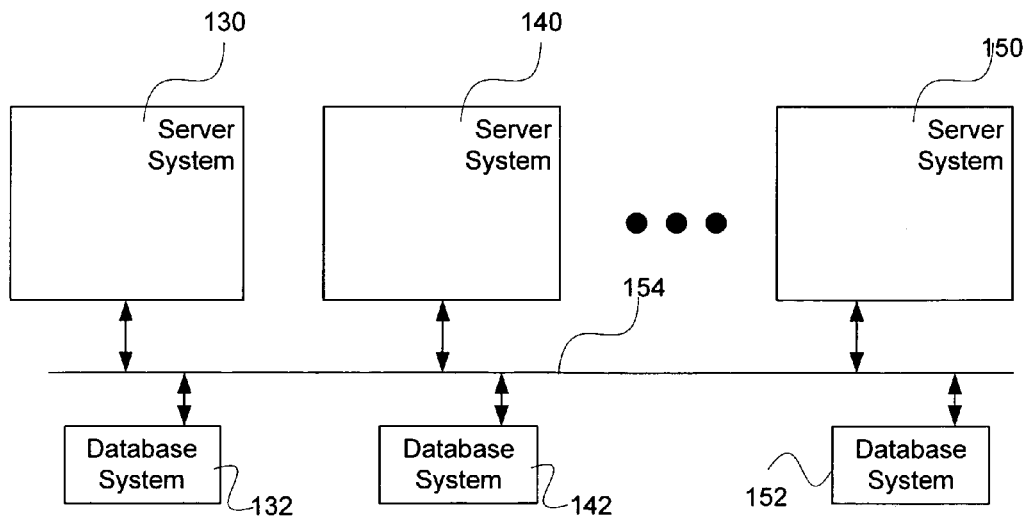
FIG. 1B is a block diagram illustrating an embodiment of a database system.

FIG. 1B is a block diagram illustrating an embodiment of a database system. In some embodiments, server system 130, server system 140, and server system 150 are used to implement server system 100, server system 110, and server system 120, respectively. In the example shown, server system 130, server system 140, and server system 150 are connected to communication bus 154. Database 132, database 142, and database 152 are connected to communication bus 154. In various embodiments, the number of server systems is the same as the number of database systems, the number of server systems is greater than the number of database systems, or the number of server systems is less than the number of database systems.

In some embodiments, the databases in the server systems (e.g., database 132 in server system 130, database system 142 in server system 140, and database 152 in server system 150) keep in synchronization by having each server system synchronize data on all databases using communication bus 154. For example, synchronization steps include a local prepare, a remote prepare, a local commit and a remote commit step. Local prepare tests the transaction conditions locally and creates local transactional state so any other queries being processed on the same server will know this update is pending. Remote prepare tests the transaction conditions on each of the remote database systems and creates transactional state in each of those database systems so any queries being processed on remote servers will know this update is pending. Local commit irrevocably logs the transaction as committed and updates the local data to a new value. Remote commit updates each remote copy of the data to a new value.

Figure 1C:
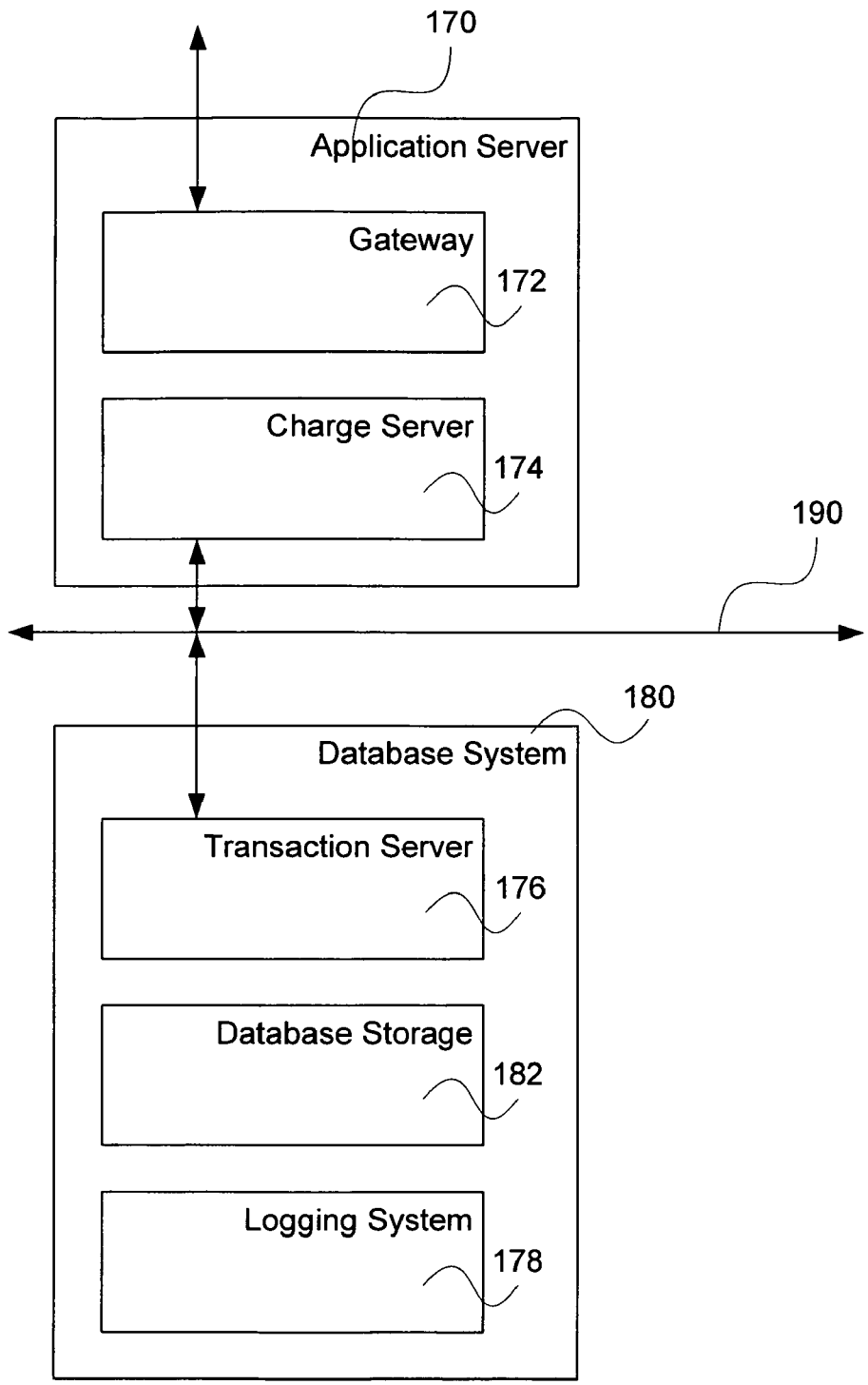
FIG. 1C is a block diagram illustrating an embodiment of a server system.

FIG. 1C is a block diagram illustrating an embodiment of a server system. In some embodiments, application server system 170 is used to implement server system 130, server system 140, and/or server system 150. In some embodiments, database system 180 is used to implement database system 102, database system 112, database system 122, database system 132, database system 142, and/or database system 152. In the example shown, application server system 170 comprises gateway 172 and charge server 174. Gateway 172 interfaces with other servers to receive queries. Charge server 174 calculates a charge associated with a query (e.g., a telephone charge associated with a call, a text charge for a text message, a data charge for a data message, etc.). Database system comprises transaction server 176, database storage 182, and logging system 178. Transaction server 176 conveys information to logging system 178 in order to log a transaction. Database storage 182 stores data (e.g., balance(s), customer data, charging information, etc.). A query is received by gateway 172 (e.g., a query requesting a service, a call time, a message, from a network, etc.). The query is translated by application server 170 so that charge server 174 determines appropriate charge(s) and/or approval(s) for charge(s). Charge server 174 determines the appropriate charge(s) and/or approval(s) for charge(s) based at least in part on request(s) to transaction server 176. Transaction server 176 helps to determine appropriate charge(s) and/or approval(s) for charge(s) by checking data stored in database storage 182. For example, a balance is checked for a user requesting approval for a call (e.g., a certain number of minutes for a call). In some embodiments, transaction server 176 comprises a commit engine and an update handler, where the commit engine is used to commit a transaction on one or more databases and wherein the update handler handles update processing to the database and database storage (e.g., database storage 182). Logging system 178 logs a transaction (e.g.; a call charge is logged so that a bill to a user can be determined).

Figure 1D:
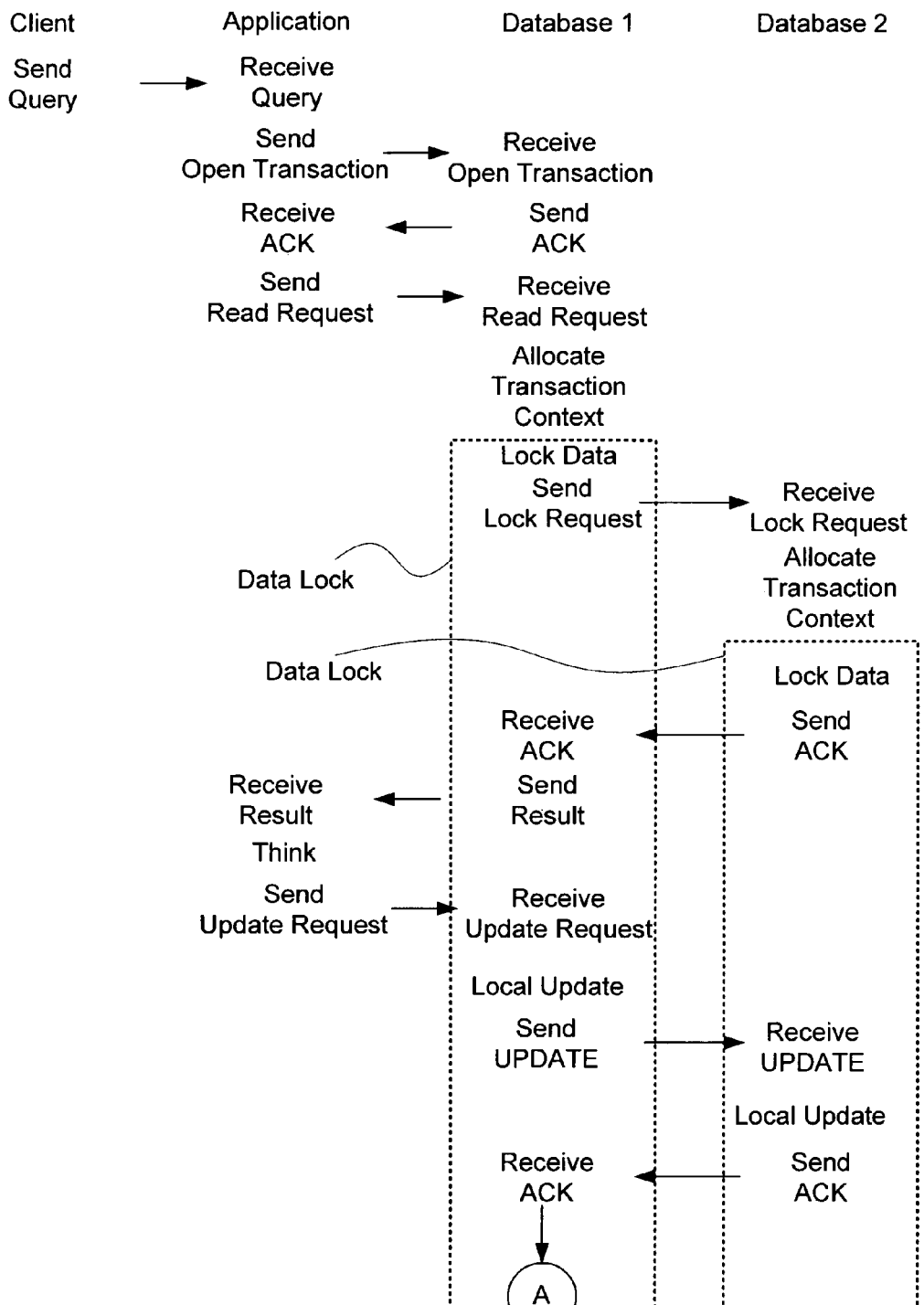
FIG. 1D is a time line illustrating an embodiment of a prior art transaction process.

FIG. 1D is a time line illustrating an embodiment of a prior art transaction process. In the example shown, Client sends a query to Application. Application receives query. Application sends Open Transaction to Database 1. Database 1 receives Open Transaction. Database 1 sends an acknowledgement (e.g., ACK) to Application. Application receives ACK. Application sends read request to Database 1. Database 1 receives read request. Database 1 allocates transaction context. Database 1 locks data (e.g., data that is used in the calculation step, data that is to be updated, etc.). Database 1 sends a Lock Request to Database 2. Database 2 receives lock request. Database 2 allocates transaction context. Database 2 locks data (e.g., data that is used in the calculation step, data that is to be updated, etc.). Database 2 sends ACK to database 1. Database 1 receives ACK from database 2. Database 1 sends result of read request to Application. Application uses the result to calculate or think regarding the received query. Application sends update request to database 1. Database 1 receives update request. Database 1 processes the update locally. Database 1 sends UPDATE to database 2. Database 2 receives UPDATE. Database 2 processes the update locally. Database 2 sends ACK to database 1. Database 1 receives ACK from database 2. Transaction process continues at marker A.

Figure 1E:
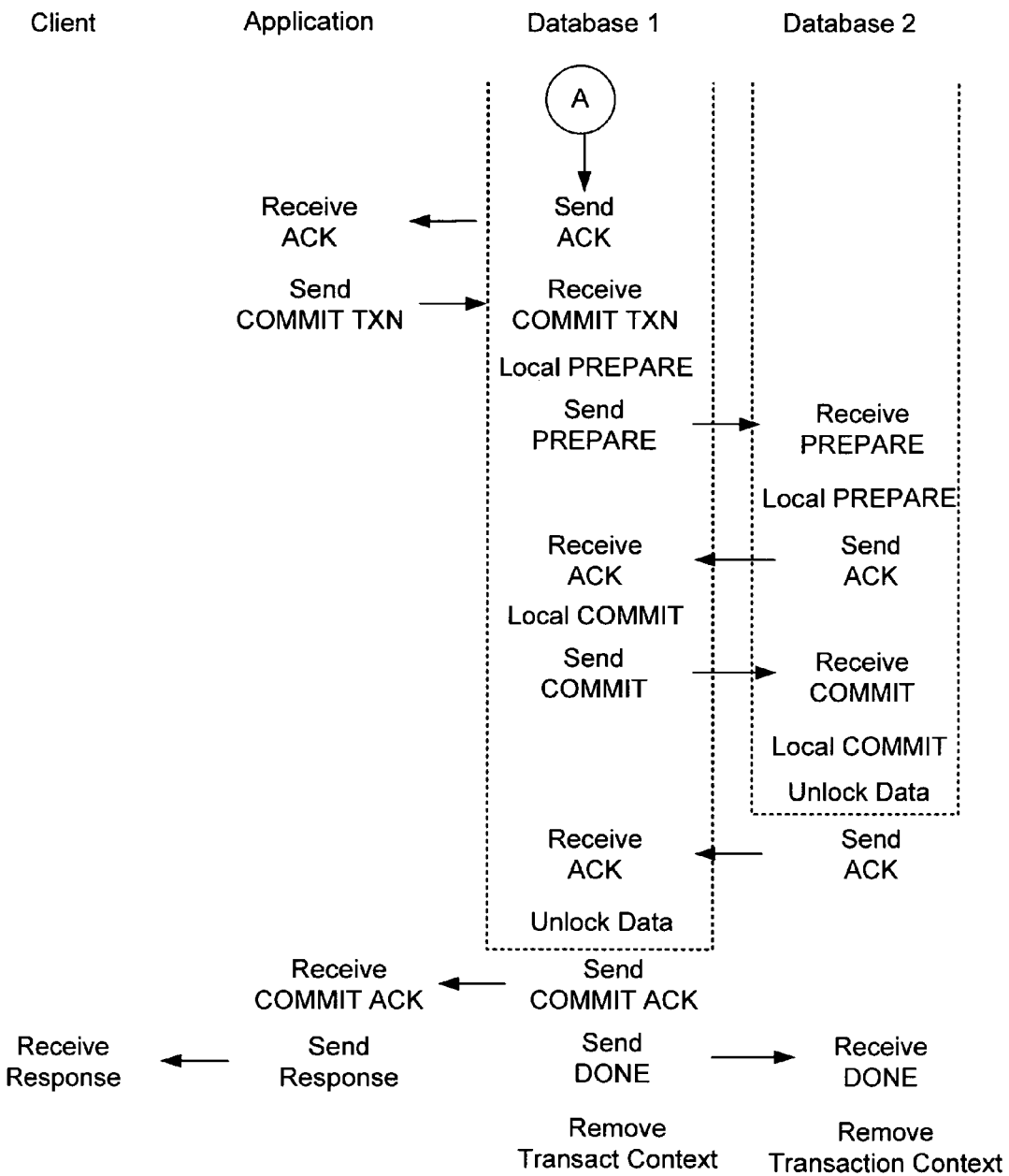
FIG. 1E is a time line illustrating an embodiment of a prior art transaction process.
Figure 1F:
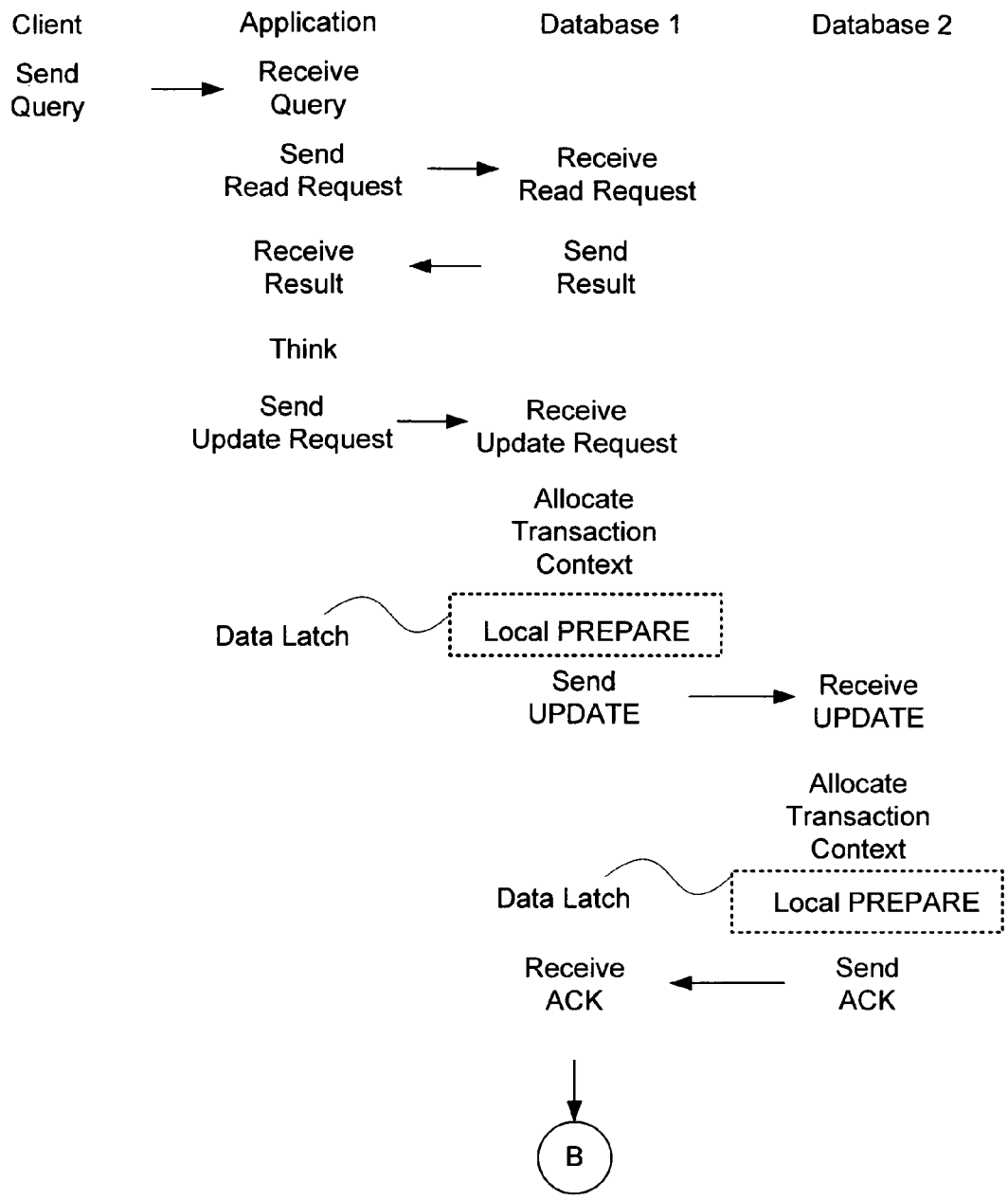
FIG. 1F is a time line illustrating an embodiment of a transaction process.

FIG. 1E is a time line illustrating an embodiment of a prior art transaction process. In the example shown, database 1 sends ACK to Application. Application receives ACK from database 1. Application sends COMMIT TXN (e.g., a commit transaction command) to database 1. Database 1 receives COMMIT TXN. Database 1 processes a local PREPARE. Database 1 sends PREPARE to database 2. Database 2 receives PREPARE from database 1. Database 2 processes a local PREPARE. Database 2 sends ACK to database 1. Database 1 receives ACK from database 2. Database 1 processes a local COMMIT. Database 1 sends COMMIT to database 2. Database 2 receives COMMIT from database 1. Database 2 processes a local COMMIT. Database 2 unlocks data. Database 2 sends ACK to database 1. Database 1 receives ACK from database 1. Database 1 unlocks data. Database 1 sends COMMIT ACK to Application. Application receives COMMIT ACK from database 1. Application sends response to client and client receives response. Database 1 sends DONE to database 2 and database 2 receives DONE from database 1. Database 1 removes transaction context. Database 2 removes transaction context. In some embodiments, the transaction context comprises a transaction buffer and removal of the transaction context comprises deallocation of the transaction buffer. Note that the updating within the prior art of FIGS. 1D and 1E does not include preparing and committing of the transaction FIG. 1F is a time line illustrating an embodiment of a transaction process. In the example shown, Client sends a query to Application. Application receives a query from Client. Application sends read request to database 1. Database 1 receives read request from Application. Database 1 sends result to Application. Application receives result from database 1. Application thinks or calculates using result regarding the received query. Application sends update request to database 1. Database 1 receives update request from Application. For the transaction process of FIGS. 1F and 1G, the update request comprises the transaction commit. Database 1 allocates transaction context. Database 1 processes a local PREPARE. Relevant data in database 1 is latched, not locked, during a short window of the processing of the local PREPARE. Database 1 sends UPDATE to database 2 (e.g., a command to process an update). Database 2 receives UPDATE from database 1. Database 2 allocates transaction context. Database 2 processes a local PREPARE. Relevant data in database 2 is latched, not locked, during a short window of the processing of the local PREPARE. Database 2 sends an ACK to database 1. Transaction process continues at marker B. In some embodiments, update request is interpreted as "update this data and immediately commit the transaction" so the update request causes the PREPARE/COMMIT/DONE protocol to run in its entirety.

Figure 1G:
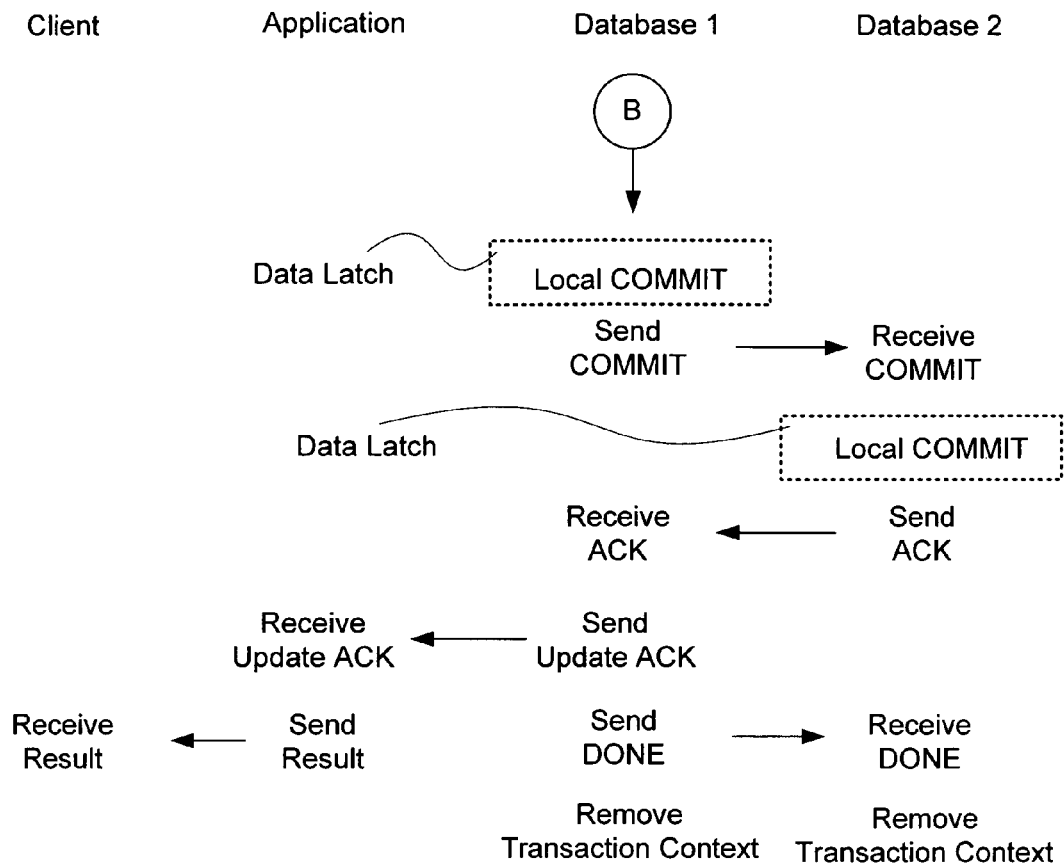
FIG. 1G is a time line illustrating an embodiment of a transaction process.

FIG. 1G is a time line illustrating an embodiment of a transaction process. In the example shown, database 1 processes a local COMMIT. Relevant data in database 1 is latched, not locked, during a short window of the processing of the local COMMIT. Database 1 sends COMMIT to database 1. Database 2 receives COMMIT from database 1. Database 2 processes a local COMMIT. Relevant data in database 2 is latched, not locked, during a short window of the processing of the local COMMIT. Database 2 sends ACK to database 1. Database 1 receives ACK from database 2. Database 1 sends Update ACK to Application. Application receives Update ACK from database 1. Application sends result to Client. Client receives result from Application. Database 1 sends DONE to database 2. Database 2 receives DONE from database 1. Database 1 removes transaction context. Database 2 removes transaction context. In some embodiments, the transaction context comprises a transaction buffer and removal of the transaction context comprises deallocation of the transaction buffer.

Figure 2A:
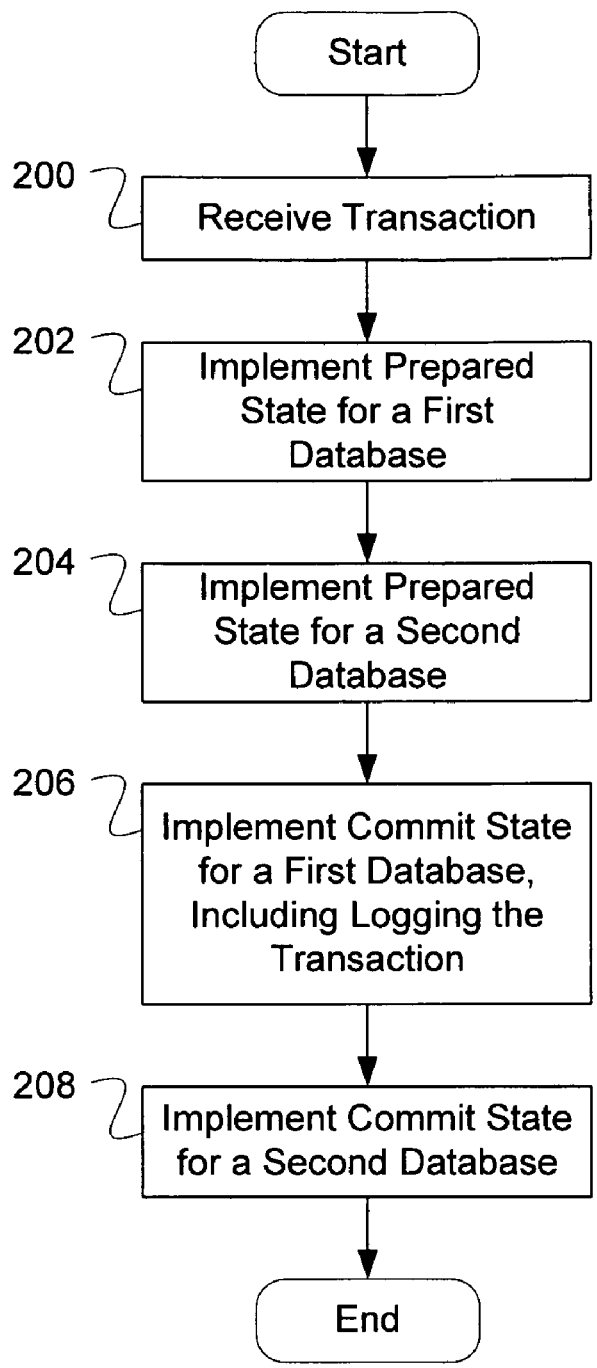
FIG. 2A is a flow diagram illustrating an embodiment of a process for a system for multiple conditional commit databases.

FIG. 2A is a flow diagram illustrating an embodiment of a process for a system for multiple conditional commit databases. In the example shown, in 200 a transaction is received. In 202, a prepared state is implemented for a first database. In some embodiments, the first database comprises a local database. In 204, a prepared state is implemented for a second database. In some embodiments, the second database comprises a non-local database. In some embodiments, the second database is one of a plurality of non-local databases in which the prepared state is to be implemented. In various embodiments, the prepared stated is implemented using a first server processor, a second server processor, or any other appropriate local or non-local processor. In 206, a commit state is implemented for a first database (including, in some embodiments, logging the transaction). In some embodiments, the first database comprises a local database. In 208, a commit state is implemented for a second database. In some embodiments, the second database comprises a non-local database. In some embodiments, the second database is one of a plurality of non-local databases in which the prepared state is to be implemented. In various embodiments, the prepared stated is implemented using a first server processor, a second server processor, or any other appropriate local or non-local processor.

Figure 2B:
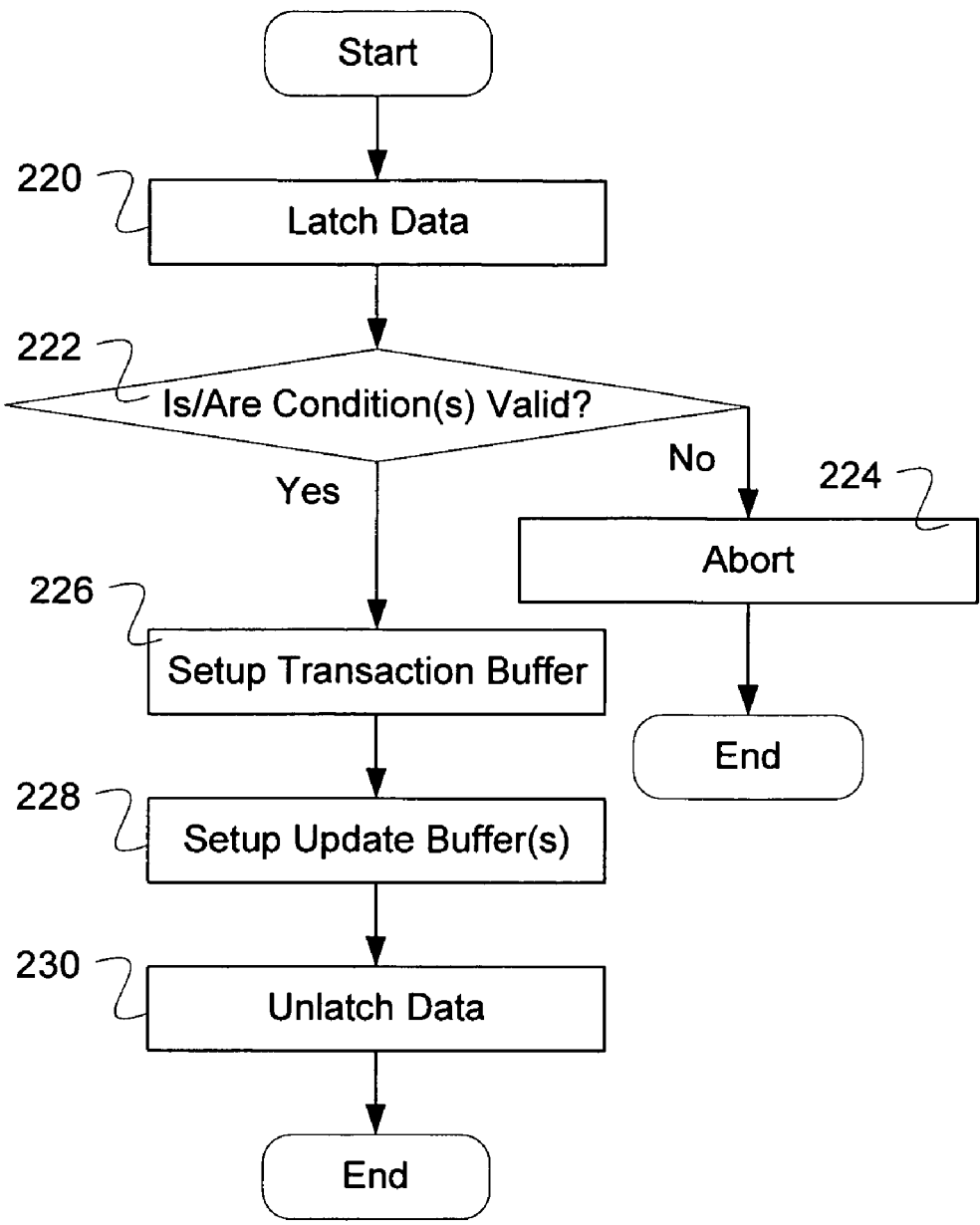
FIG. 2B is a flow diagram illustrating a process for implementing a prepare state.

FIG. 2B is a flow diagram illustrating a process for implementing a prepare state. In some embodiments, the prepare state is implemented locally or non-locally. In the example shown, in 220 data is latched. In 222, it is determined whether one or more conditions is/are valid. In various embodiments, there is one condition, there is a plurality of conditions that all must be true, there are no conditions, there are a number of conditions and a majority must be true, or any other appropriate number of conditions and/or any other appropriate tests regarding the number of conditions. In the event that the one or more conditions is/are not valid, in 224 the transaction is aborted. In the event that the condition is valid, in 226 a transaction buffer is setup. In 228, update buffer(s) is/are setup. In some embodiments, update buffer(s) is/are allocated out of a pool or located in the event that an update buffer already exists. In 230, data is unlatched.

Figure 2C:
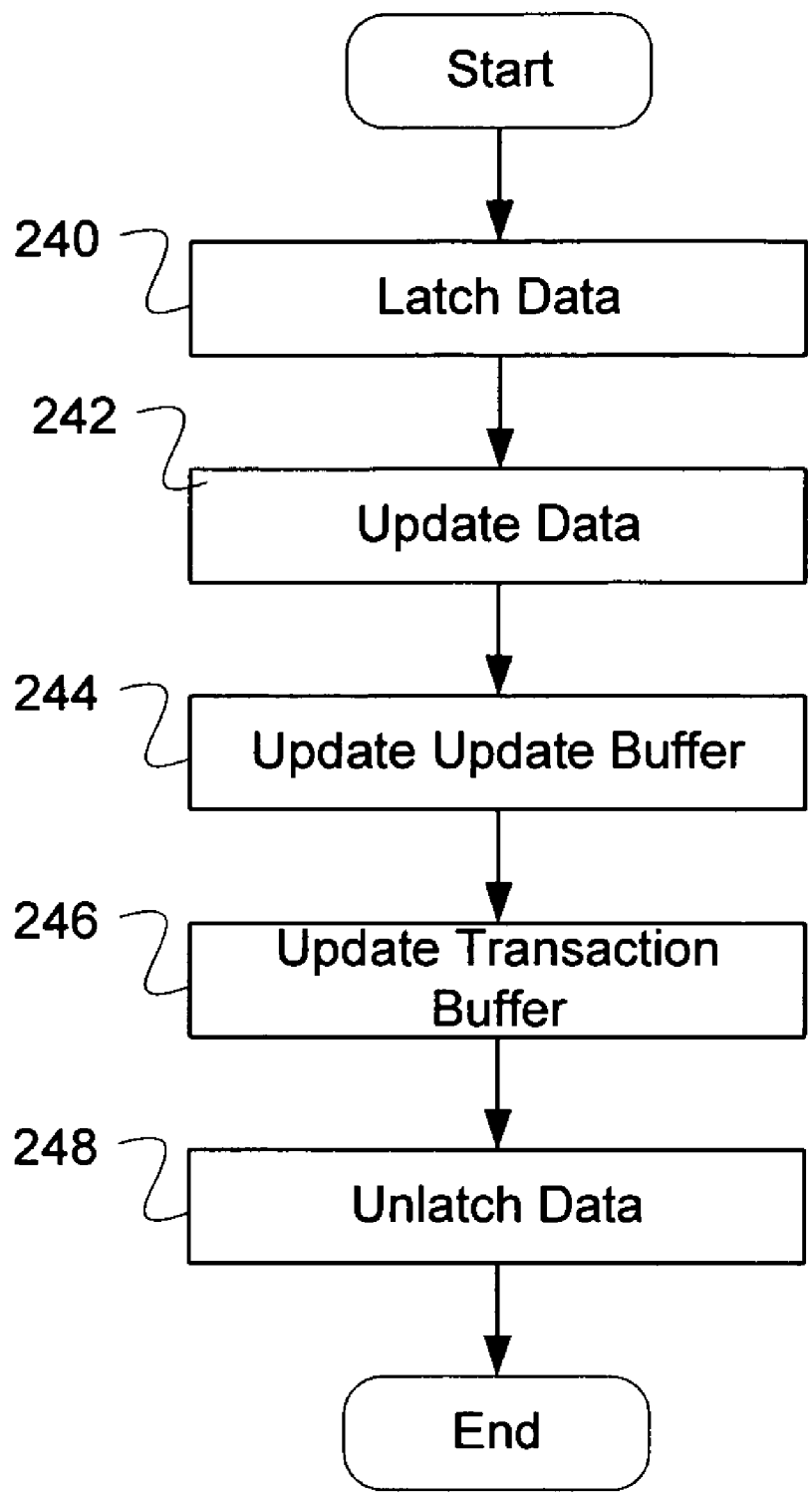
FIG. 2C is a flow diagram illustrating a process for implementing a commit state.

FIG. 2C is a flow diagram illustrating a process for implementing a commit state. In some embodiments, the commit state is implemented locally or non-locally. In the example, shown, in 240 data is latched. In 242, data is updated. In 244, the update buffer is updated. In some embodiments, updating of the update buffer comprises updating the state of the update buffer(s) to reflect a committed transaction (or the change of state). In various embodiments, the update buffer is deallocated as part of the updating, is not deallocated, or any other appropriate action relating to the updating of the update buffer. In 246, transaction buffer is updated. In various embodiments, the transaction buffer is deallocated as part of the updating, is not deallocated, or any other appropriate action relating to the updating of the transaction buffer. In 248, data is unlatched. In various embodiments, an additional stage to commit is included in committing, an additional done stage is included in committing, or any other appropriate single or multistage commit is performed.

Figure 3:
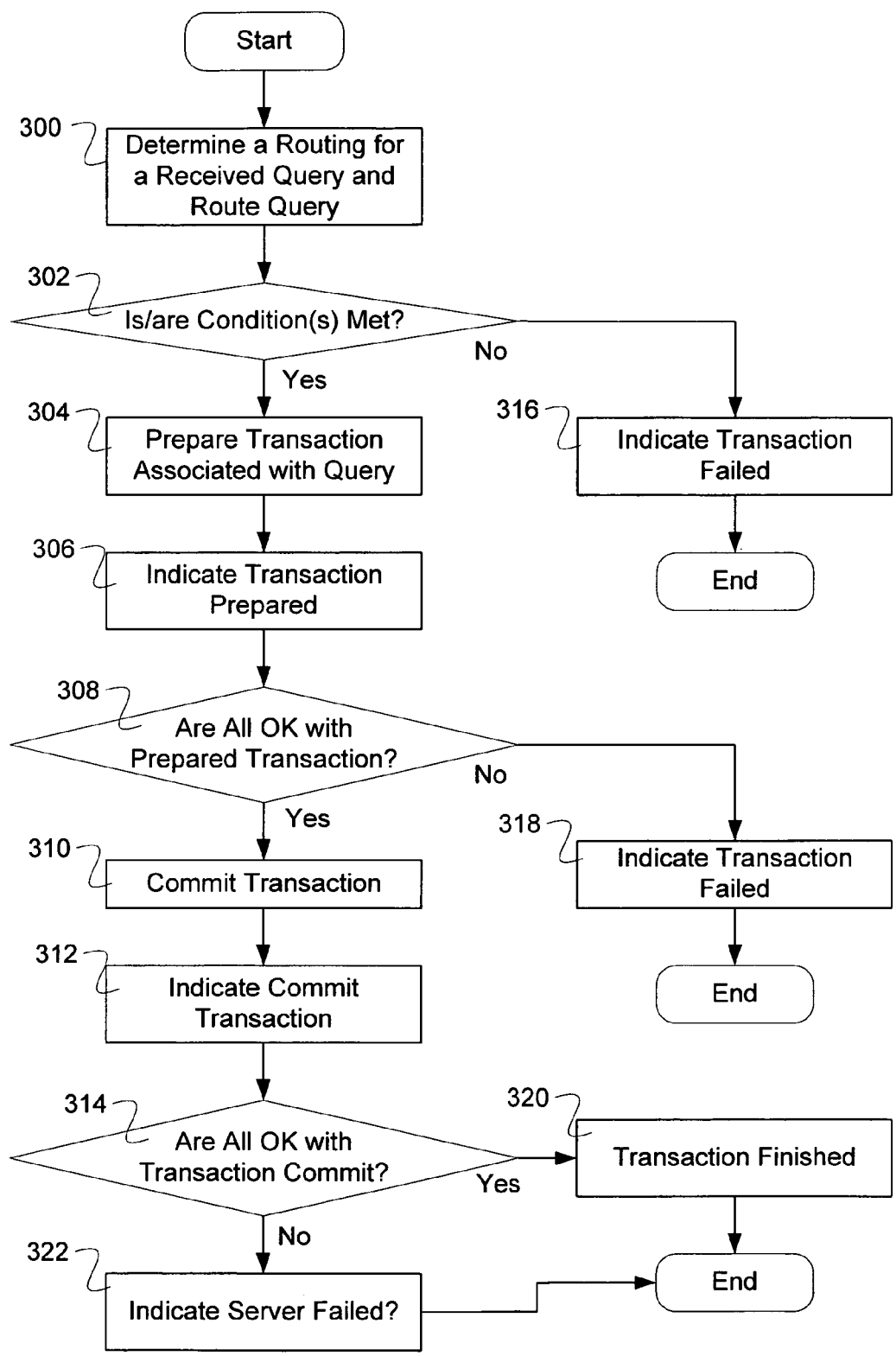
FIG. 3 is a flow diagram illustrating an embodiment of a process for a system with multiple conditional commit databases.

FIG. 3 is a flow diagram illustrating an embodiment of a process for a system with multiple conditional commit databases. In the example shown, in 300 a routing is determined for a received query and the query is routed. In some embodiments, there are multiple steps between the steps shown in FIG. 3 including reading related data, calculating updates, and submitting update transaction. In 302, it is determined whether condition(s) is/are met. In the event that conditions are not met, then in 316, it is indicated that the transaction failed. In some embodiments, a condition is met when the condition is satisfied—for example, a condition that requires that a balance (e.g., a balance is equal to $162) is greater than $150 is satisfied. In some embodiments the indication of transaction failure prompts a recalculation and resubmission of the query. In the event that the condition(s) is/are met, then in 304 a transaction is prepared associated with the query. In some embodiments, preparation of the transaction includes determining one or more transaction data structures—for example, a transaction buffer and/or update buffer(s). In 306, an indication of the prepared transaction is sent out. For example the indication is sent to all other databases/server systems. In various embodiments, the indication is multicast, the indication is sent out to other systems one by one, the indication includes an instruction causing a prepare to execute on the remote server, the indication executes the prepare on the remote server, or any other appropriate indication. In 308, it is determined whether all are OK with the prepared transaction. For example, each other server system indicates that prepare of the transaction is OK, and the server system keeps track to ensure that each other server system has indicated their OK. In the event that all are not OK with the prepared transaction, in 318 an indication that the transaction failed is transmitted.

In the event that all are OK with the prepared transactions, then in 310 the transaction is committed. In some embodiments, the commitment of the transaction comprises logging the transaction. In 312, an indication is sent out of the transaction commit. In 314, it is determined whether all are OK with the transaction commit. In some embodiments, the determination of whether all other servers are OK with the commit includes keeping track of received indications from each of the other servers that the commit is OK. In the event that all are not OK with the transaction commit, in 322 it is indicated that a server may have failed. In the event that all are OK with the transaction, then in 320 it is indicated that the transaction is finished.

Figure 4A:
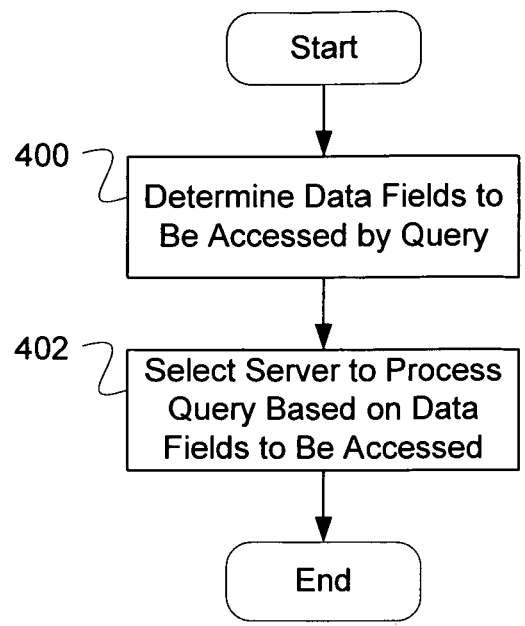
FIG. 4A is a flow diagram illustrating an embodiment of a process for determining a routing.

FIG. 4A is a flow diagram illustrating an embodiment of a process for determining a routing. In some embodiments, the process of FIG. 4A is used to implement 300 of FIG. 3. In the example shown, in 400 data fields are determined that are to be accessed by a query. In 402, a server is selected to process query based on data fields to be accessed. For example, a server is selected using a mapping between data fields associated with query and a server (e.g., customers with a criteria involving last names—for example, beginning with letters A-E—are associated with server 1, customers with a criteria involving customer ID's—for example, ID number falling in the range 0-10000—are associated with server 2, calls originating in a region—for example, California—are associated with server 6, calls that are roaming, etc.).

Figure 4B:
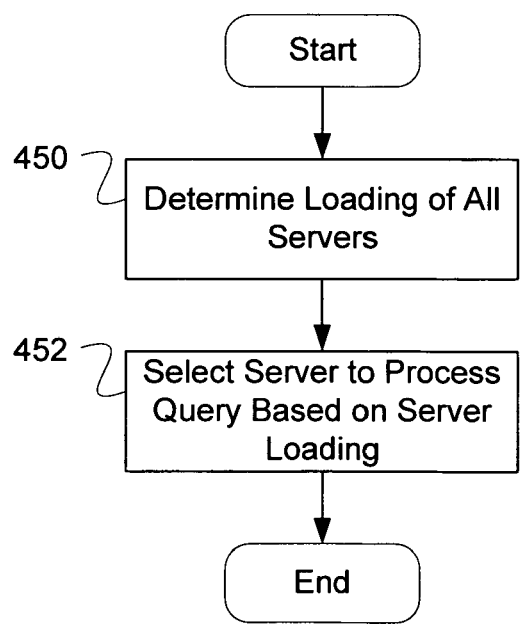
FIG. 4B is a flow diagram illustrating an embodiment of a process for determining a routing.

FIG. 4B is a flow diagram illustrating an embodiment of a process for determining a routing. In some embodiments, the process of FIG. 4A is used to implement 300 of FIG. 3. In the example shown, in 450 loading of all servers are determined. In 452, a server is selected to process query based on server loading. For example, a server is selected that has the lowest processor loading, a server is selected that has the lowest data storage loading, etc.

In some embodiments, the server routing is random. In some embodiments, the server routing is according to a predetermined sequence.

Figure 5:
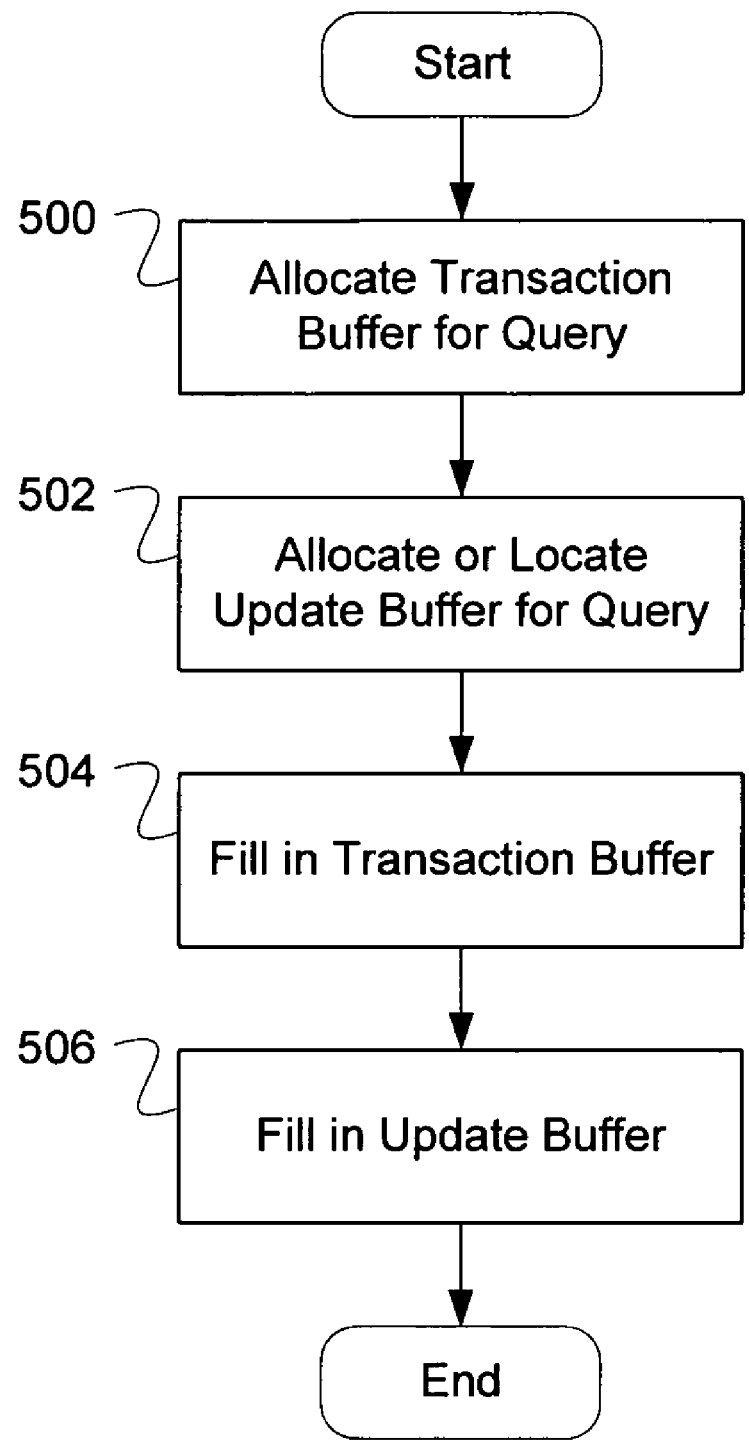
FIG. 5 is a flow diagram illustrating an embodiment of a process for preparing a transaction.

FIG. 5 is a flow diagram illustrating an embodiment of a process for preparing a transaction. In some embodiments, the process of FIG. 5 is used to implement 304 of FIG. 3. In the example shown, in 500 a transaction buffer is allocated for the query. In 502, update buffer(s) is/are allocated or located for the query. In 504, the transaction buffer is filled in. In 506 the update buffer is filled in. In some embodiments, in the event that the transaction buffer and/or update buffer(s) is/are already allocated then the transaction buffer and/or update buffer(s) are updated appropriately In some embodiments, an update buffer is associated with a data that is to be updated or is associated with a query.

Figure 6A:
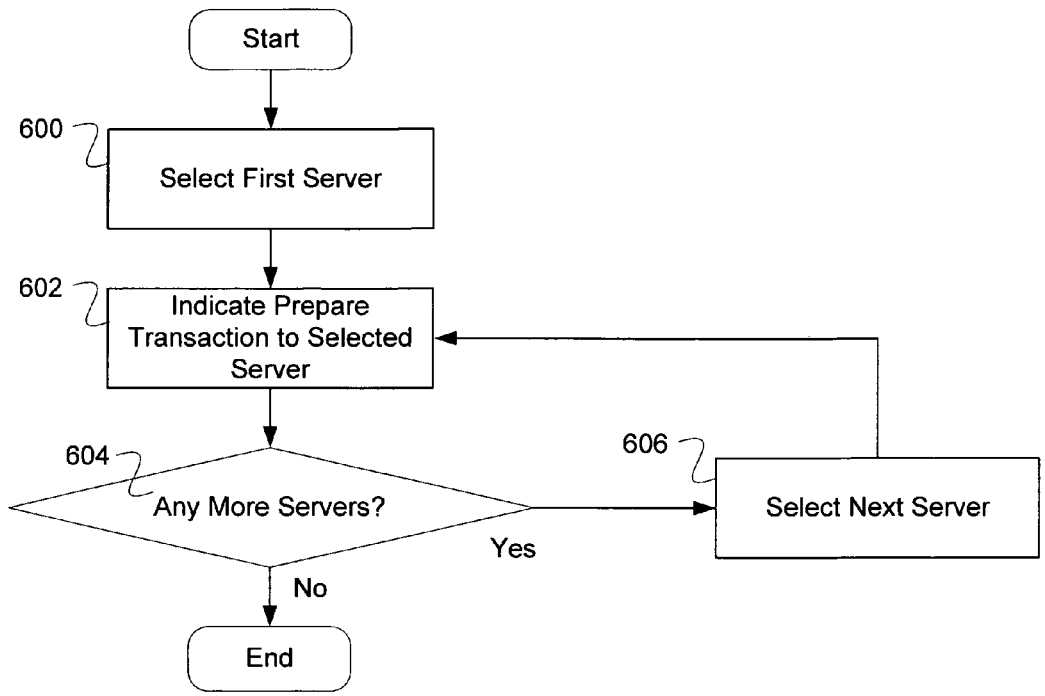
FIG. 6A is a flow diagram illustrating an embodiment of a process for sending out an indication of a prepare transaction.

FIG. 6A is a flow diagram illustrating an embodiment of a process for sending out an indication of a prepare transaction. In some embodiments, the process of FIG. 6A is used to implement 306 of FIG. 3. In the example shown, in 600 a first server is selected. In 602, an indication is sent of prepare transaction to selected server. In 604, it is determined whether there are any more servers. In the event that there are more servers, in 606 a next server is selected. In the event that there are no more servers, the process ends.

Figure 6B:
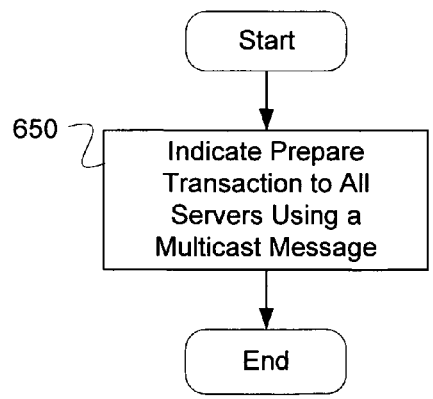
FIG. 6B is a flow diagram illustrating an embodiment of a process for sending out an indication of a prepare transaction.

FIG. 6B is a flow diagram illustrating an embodiment of a process for sending out an indication of a prepare transaction. In some embodiments, the process of FIG. 6B is used to implement 306 of FIG. 3. In the example shown, in 650, an indication of a prepare transaction is sent to all servers using a multicast message.

Figure 7A:
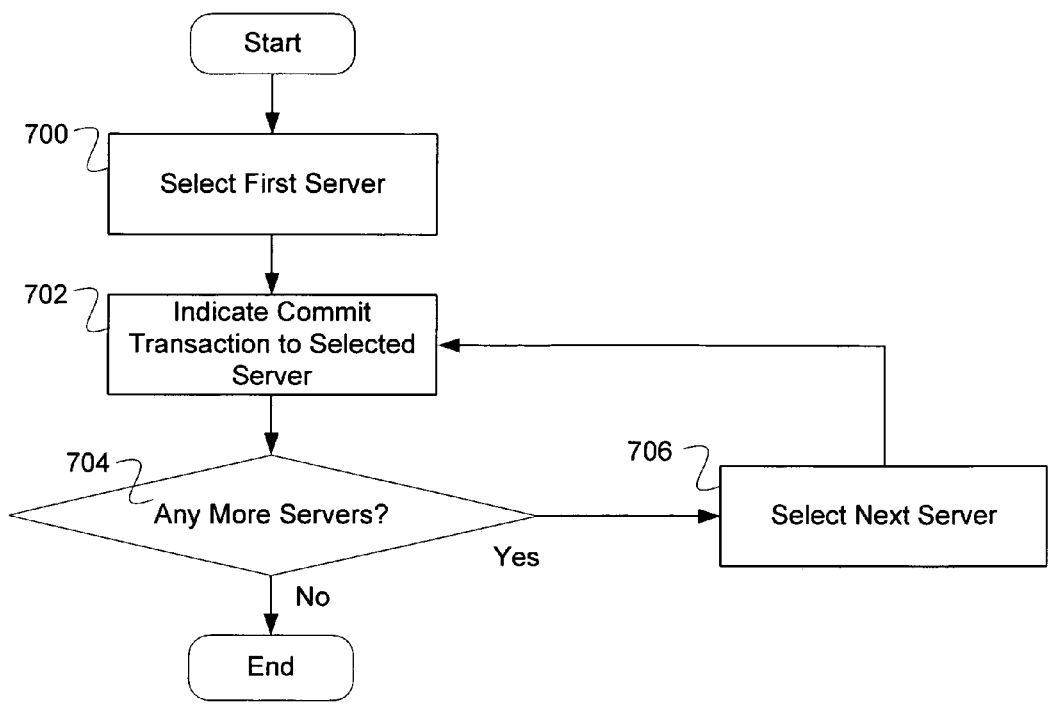
FIG. 7A is a flow diagram illustrating an embodiment of a process for sending out an indication of a commit transaction.

FIG. 7A is a flow diagram illustrating an embodiment of a process for sending out an indication of a commit transaction. In some embodiments, the process of FIG. 7A is used to implement 312 of FIG. 3. In the example shown, in 700 a first server is selected. In 702, an indication is sent of a commit transaction to selected server. In 704, it is determined whether there are any more servers. In the event that there are more servers, in 706 a next server is selected. In the event that there are no more servers, the process ends.

Figure 7B:
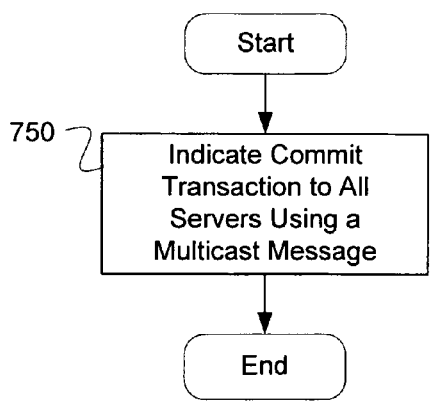
FIG. 7B is a flow diagram illustrating an embodiment of a process for sending out an indication of a commit transaction.

FIG. 7B is a flow diagram illustrating an embodiment of a process for sending out an indication of a commit transaction. In some embodiments, the process of FIG. 7B is used to implement 312 of FIG. 3. In the example shown, in 750, an indication of a commit transaction is sent to all servers using a multicast message.

Figure 8:
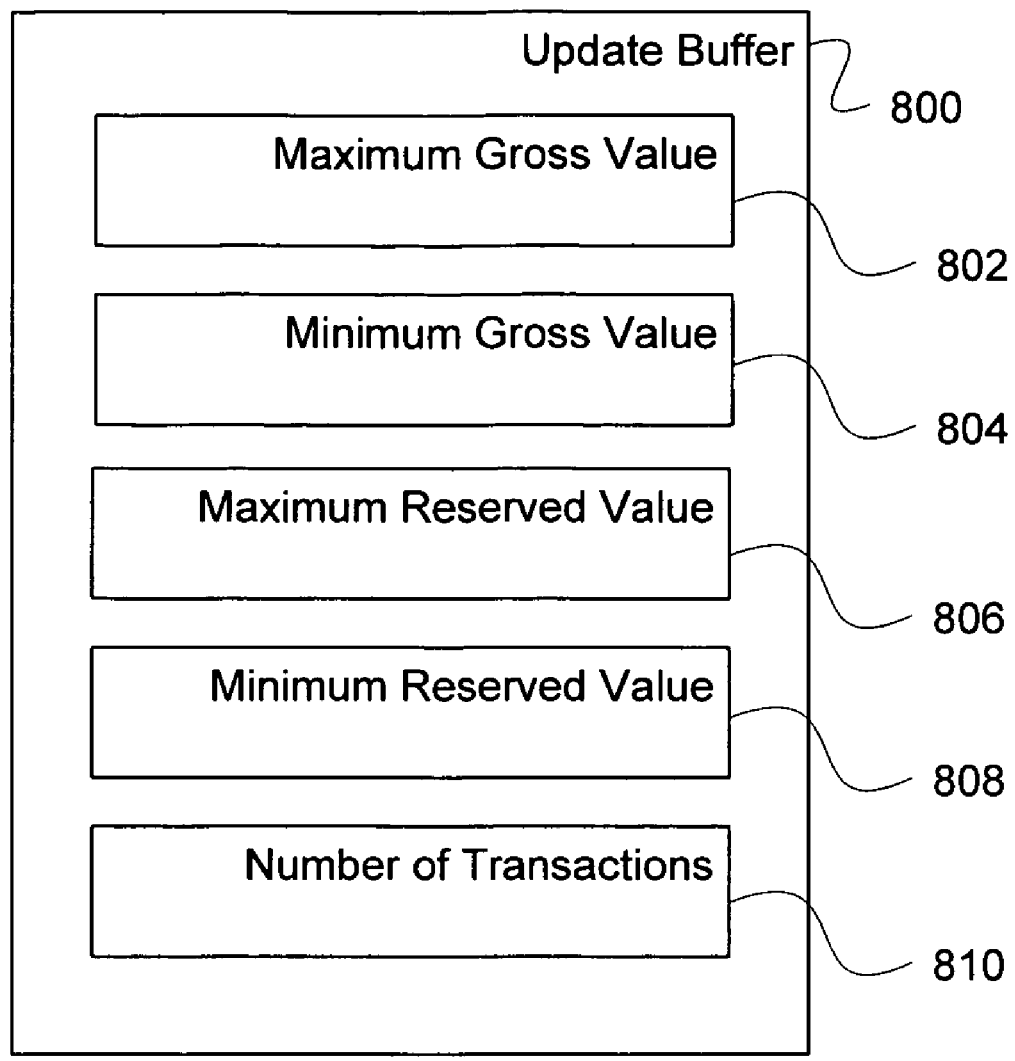
FIG. 8 is a block diagram illustrating an embodiment of an update buffer.

FIG. 8 is a block diagram illustrating an embodiment of an update buffer for a set of data containing two numeric variables—gross and reserved. In the example shown, update buffer 800 includes: maximum gross value 802, minimum gross value 804, maximum reserved value 806, minimum reserved value 808, and number of transactions 810. Maximum gross value 802 comprises the maximum possible value for the gross variable after all outstanding transactions complete in any combination of commits and aborts. Minimum gross value 804 comprises the minimum possible value for the gross variable after all outstanding transactions complete in any combination of commits and aborts. Maximum reserved value 806 comprises the maximum possible value for the reserved variable after all outstanding transactions complete in any combination of commits and aborts. Minimum reserved value 808 comprises the minimum possible value for the reserved variable after all outstanding transactions complete in any combination of commits and aborts. Number of transactions 810 comprises a count of how many transactions are in process against this set of data.

Figure 9:
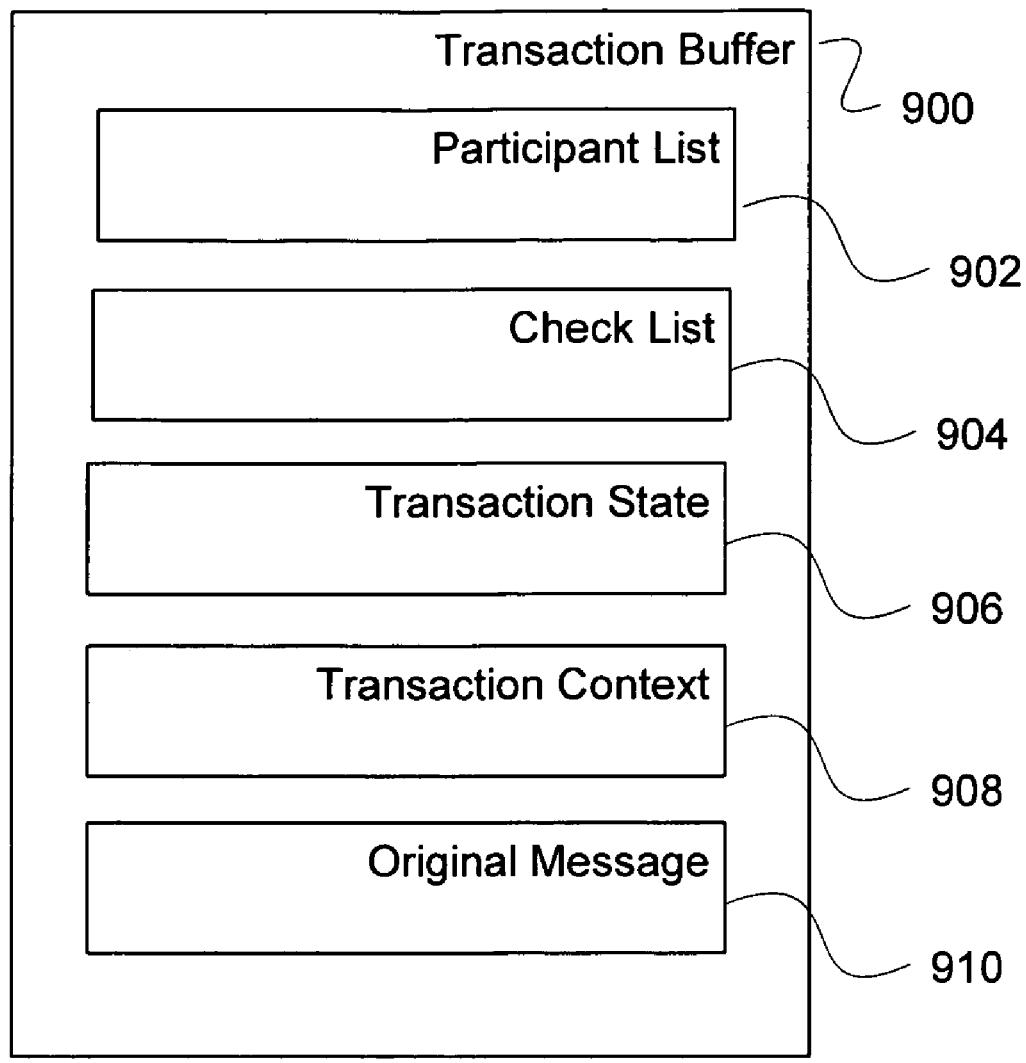
FIG. 9 is a block diagram illustrating an embodiment of a transaction buffer.

FIG. 9 is a block diagram illustrating an embodiment of a transaction buffer. In the example shown, transaction 900 comprises participant list 902, check list 904, transaction state 906, transaction context 908, and original message 910. Participant list 902 comprises a list of servers. Check list 904 comprises a list used to track received messages from servers in participant list 902. Transaction state 906 comprises a prepare state or a commit state. In various embodiments, transaction state 906 comprises a complete state, a done state, or any other appropriate state for a transaction. Transaction context 908 comprises actions and conditions associated with the transaction. Original message 910 comprises the original transaction request. In some embodiments, transaction conditions comprise conditions associated with a transaction that must be satisfied in order for the transaction to be allowed. Transaction actions comprise actions that are required to be executed based on the received request.

Figure 10:
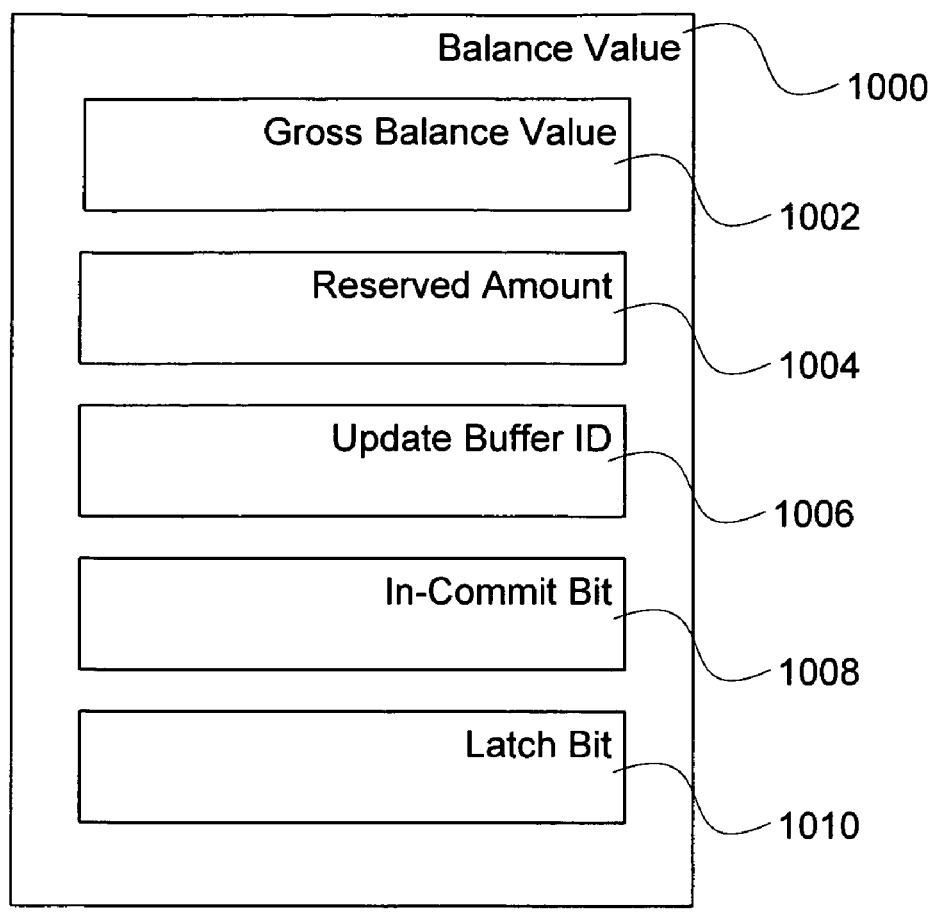
FIG. 10 is a block diagram illustrating an embodiment of a balance entry in a database.

FIG. 10 is a block diagram illustrating an embodiment of a balance entry in a database. In some embodiments, the balance entry comprises a data stored in the database. In some embodiments, the balance entry can have simultaneous updates. In the example shown, balance entry 1000 comprises gross balance value 1002, reserved amount 1004, update buffer ID 1006, in-commit bit 1008, and latch bit 1010. Gross balance value 1002 comprises the value for the balance without respect for activity that is currently underway (e.g., a balance remaining on a phone billing account—minutes remaining, independent of whether a customer is currently on the phone). Reserved amount 1004 comprises the amount of the gross balance that has been allocated (reserved) for activity that is currently underway (e.g., if the customer is on the phone, and 10 minutes have been initially allocated for the call, and each minute costs 10 cents, then $1 of the customer's balance will be reserved). Update buffer ID 1006 comprises a pointer to an update buffer associated with the balance value. In-commit bit 1008 comprises a bit that is set in the event that there are transactions in flight against the balance. When set, update buffer ID 1006 contains a pointer value. Latch bit 1010 comprises a bit indicating that the balance value and the update buffer associated with the balance value are latched.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for processing a transaction, comprising:
   a processor configured to check a condition using a data in a first database associated with the transaction, wherein the transaction comprises a conditional update to the data in the first database, wherein the data in the first database is latched before checking the condition and is unlatched after checking the condition, wherein checking the condition comprises reading a value of the data in the first database and comparing the value to the condition; in the event that the condition is satisfied, allocate a first update buffer, wherein the first update buffer comprises a first maximum value of the data and a first minimum value of the data being conditionally updated;
   the processor is further configured to indicate to a second database to check the same condition using a data in the second database associated with the transaction, wherein the transaction comprises a conditional update to the data in the second database, wherein the data in the second database is latched before checking the condition and is unlatched after checking the condition, wherein checking the condition comprises reading a value of the data in the second database and comparing the value to the condition; in the event that the condition is satisfied, allocate a second update buffer, wherein the second update buffer comprises a second maximum value of the data and a second minimum value of the data being conditionally updated; and
   a memory coupled to the processor and configured to provide the processor with instructions.

2. The system as in claim 1, wherein the processor is further configured to receive an indication that a check of the condition was satisfied.

3. The system as in claim 1, wherein the check of the condition using data in a first database is part of processing a prepare.

4. The system as in claim 1, wherein the check of the condition using data in the second database is part of processing a prepare.

5. The system as in claim 1, wherein the processor is further configured to determine whether to proceed with processing the transaction based at least in part on a received result of a check of the condition.

6. The system as in claim 5, wherein in the event that the condition is satisfied, a first transaction buffer is allocated.

7. The system as in claim 6, where in the first transaction buffer comprises a transaction condition list.

8. The system as in claim 6, where in the first transaction buffer comprises a transaction command.

9. The system as in claim 5, wherein allocating the first update buffer comprises creating a new update buffer.

10. The system as in claim 1, wherein the first update buffer further comprises a maximum reserved value and a minimum reserved value.

11. The system as in claim 1, wherein the first update buffer comprises a number of transactions.

12. The system as in claim 1, wherein the processor is further configured to:
    implement a commit state associated with the transaction in the first database, wherein the data in the first database is latched before implementing the commit state in the first database and is unlatched after the implementing of the commit state in the first database;
    indicate to the second database that the commit state is to be implemented in the second database, wherein the data in the second database is latched before implementing the commit state in the second database and is unlatched after the implementing of the commit state in the second database.

13. The system as in claim 12, wherein implementing the commit state comprises updating a data.

14. The system as in claim 12, wherein implementing the commit state in the first database comprises updating the first update buffer.

15. The system as in claim 12, wherein implementing the commit state comprises updating a first transaction buffer.

16. A method for processing a transaction, comprising:
    checking a condition using a data in a first database associated with the transaction, wherein the transaction comprises a conditional update to the data in the first database, wherein the data in the first database is latched before checking the condition and is unlatched after checking the condition, wherein checking the condition comprises reading a value of the data in the first database and comparing the value to the condition; in the event that the condition is satisfied, allocating a first update buffer, wherein the first update buffer comprises a first maximum value of the data and a first minimum value of the data being conditionally updated; and
    indicating to a second database to check the condition using a data in the second database associated with the transaction, wherein the transaction comprises a conditional update to the data in the second database; wherein the data in the second database is latched before checking the condition and is unlatched after checking the condition, wherein checking the condition comprises reading a value of the data in the second database and comparing the value to the condition; in the event that the condition is satisfied, allocating a second update buffer, wherein the second update buffer comprises a second maximum value of the data and a second minimum value of the data being conditionally updated.

17. A computer program product for processing a transaction, the computer program product being embodied in a non-transitory computer readable storage medium and comprising computer instructions for:

checking a condition using a data in a first database associated with the transaction, wherein the transaction comprises a conditional update to the data in the first database, wherein the data in the first database is latched before checking the condition and is unlatched after checking the condition, wherein checking the condition comprises reading a value of the data in the first database and comparing the value to the condition; in the event that the condition is satisfied, allocating a first update buffer, wherein the first update buffer comprises a first maximum value of the data and a first minimum value of the data being conditionally updated; and indicating to a second database to check the condition using a data in the second database associated with the transaction, wherein the transaction comprises a conditional update to the data in the second database, wherein the data in the second database is latched before checking the condition and is unlatched after checking the condition, wherein checking the condition comprises reading a value of the data in the second database and comparing the value to the condition; wherein in the event that the condition is satisfied, allocating a second update buffer, wherein the second update buffer comprises a second maximum value of the data and a second minimum value of the data being conditionally updated.

* * * * *